United States Patent [19]

Ter Meulen

[11] Patent Number: 6,103,118
[45] Date of Patent: Aug. 15, 2000

[54] MODULAR TRANSFER DEVICE FOR THE TRANSFER OF MATERIAL AND/OR HEAT FROM ONE MEDIUM STREAM TO ANOTHER MEDIUM STREAM, AND MODULE THEREFOR

[75] Inventor: Berend Philippus Ter Meulen, Apeldoorn, Netherlands

[73] Assignee: Nederlandse Organisatie Voor Toegepast-Natuurwetenschappelijk Onderzoek Tno, Netherlands

[21] Appl. No.: 08/860,005

[22] PCT Filed: Dec. 7, 1995

[86] PCT No.: PCT/NL95/00414

§ 371 Date: Oct. 20, 1997

§ 102(e) Date: Oct. 20, 1997

[87] PCT Pub. No.: WO96/17674

PCT Pub. Date: Jun. 13, 1996

[30] Foreign Application Priority Data

Dec. 9, 1994 [NL] Netherlands ............................ 9402090

[51] Int. Cl.[7] ............................ B01D 63/04; B01D 63/06; F28F 21/06
[52] U.S. Cl. ................................. 210/321.79; 210/321.8; 210/321.88; 210/321.89
[58] Field of Search .................................. 210/175, 177, 210/321.79, 321.8, 321.88, 321.89, 323.2, 330, 500.23; 422/45, 46

[56] References Cited

U.S. PATENT DOCUMENTS

| | | | |
|---|---|---|---|
| 2,411,238 | 11/1946 | Zender | 210/321.8 |
| 5,230,796 | 7/1993 | Ter Meulen | 210/321.8 |
| 5,252,220 | 10/1993 | Coughlin et al. | 210/644 |
| 5,366,625 | 11/1994 | Pedersen et al. | 210/321.79 |

FOREIGN PATENT DOCUMENTS

| | | |
|---|---|---|
| 0365248 | 4/1990 | European Pat. Off. . |
| 0419234 | 3/1991 | European Pat. Off. . |
| 2236537 | 2/1975 | France . |
| 8706151 | 10/1987 | WIPO . |
| 8900864 | 2/1989 | WIPO . |

*Primary Examiner*—John Kim
*Attorney, Agent, or Firm*—Bachman & LaPointe, P.C.

[57] ABSTRACT

Device for the transfer of material and/or heat from one medium stream to another medium stream is assembled from interconnected modules, each module having a number of hollow membrane fibres or tubes, which fibres or tubes are designed to be flowed through by a first medium, while a second medium can flow outside the fibres of tubes, and the ends of the fibres of tubes projecting a sealed manner through module walls lying essentially opposite each other and open into chambers with orifices for the supply and discharge of the medium, the supply orifice and the discharge orifice of adjacent modules being in register and being connected to each other in a fluid-tight manner.

9 Claims, 3 Drawing Sheets

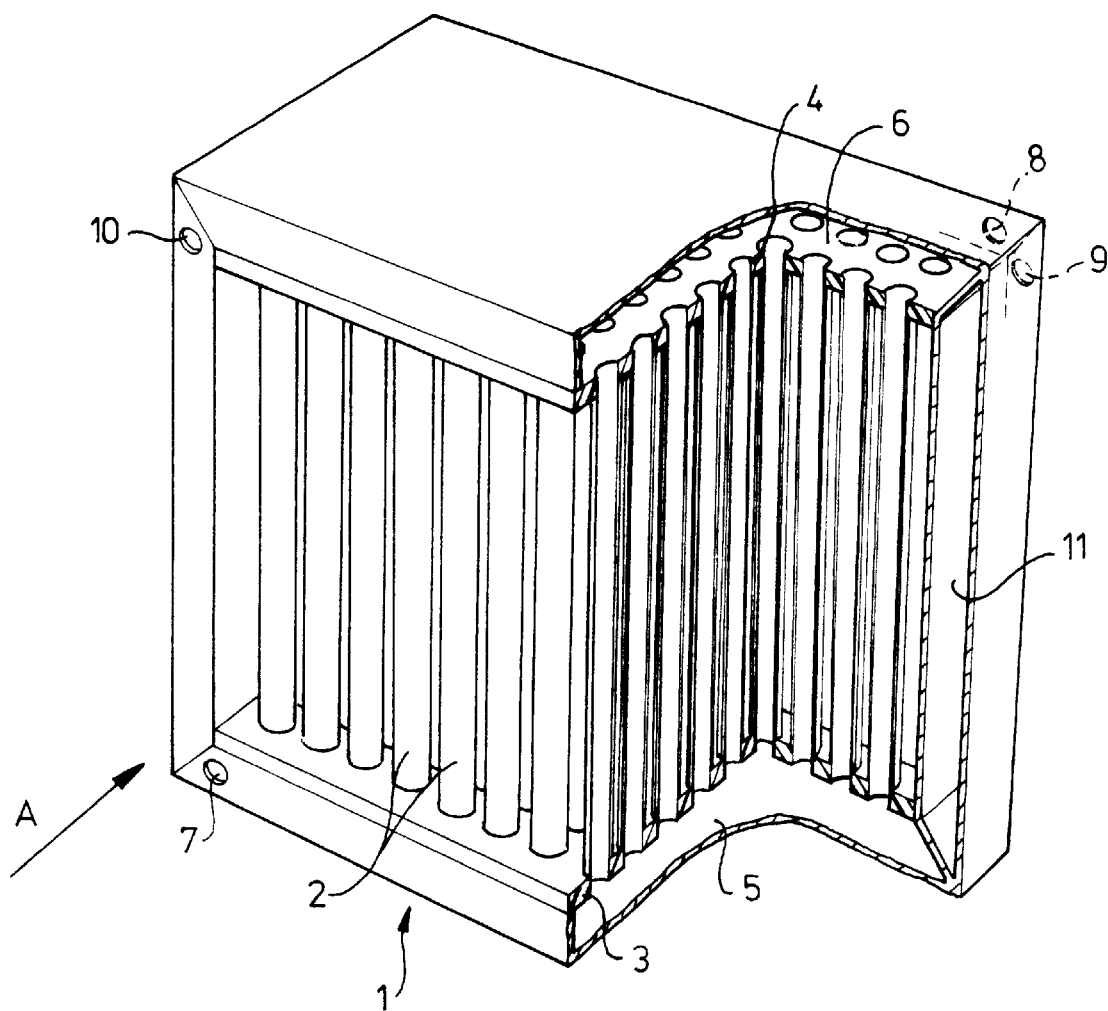

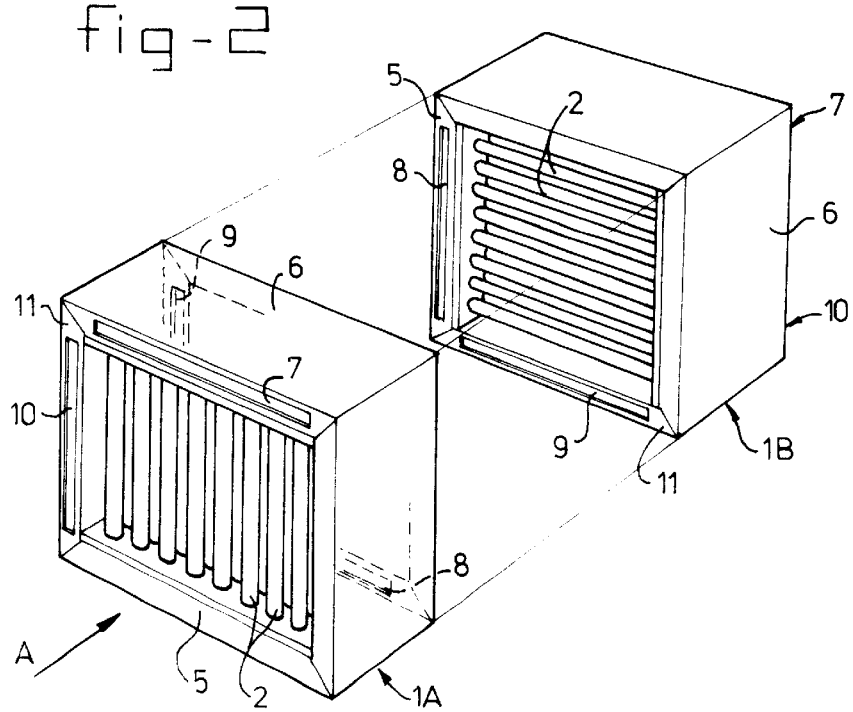
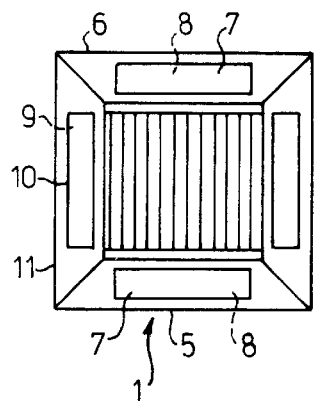
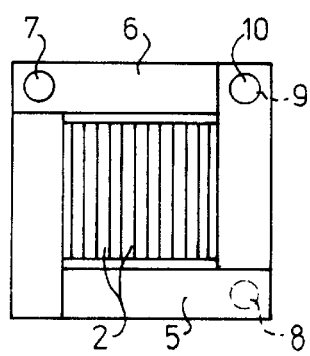
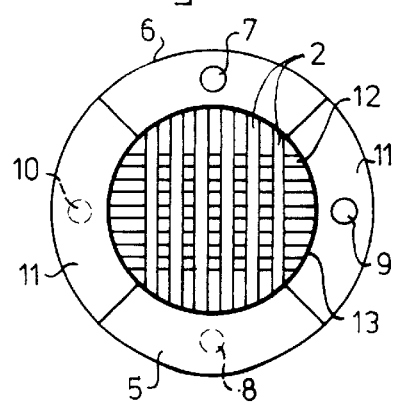

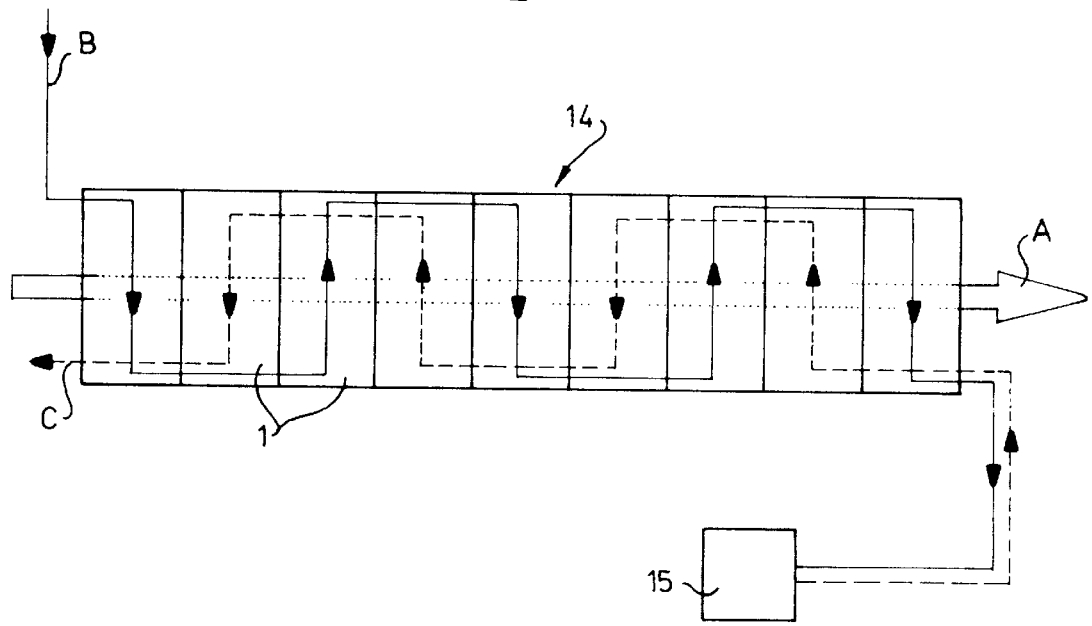
Fig-4
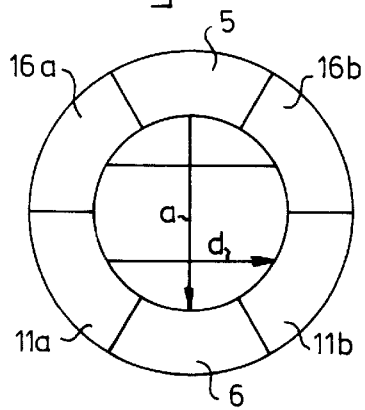
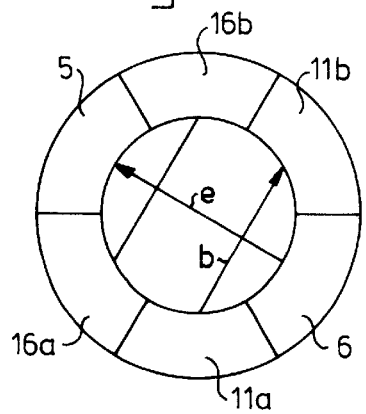
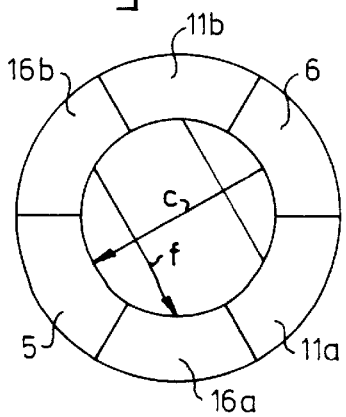
Fig-5a     Fig-5b     Fig-5c

6,103,118

MODULAR TRANSFER DEVICE FOR THE TRANSFER OF MATERIAL AND/OR HEAT FROM ONE MEDIUM STREAM TO ANOTHER MEDIUM STREAM, AND MODULE THEREFOR

BACKGROUND OF THE INVENTION

The invention relates to a device to be assembled from modules, for the transfer of material and/or heat from one medium stream to another medium stream. For this purpose, said device is assembled from modules, each having a number of hollow fibres or tubes, the fibre walls of which define a membrane through which the material and/or heat transfer can take place. In this case one medium flows through said fibres, while the other medium flows outside said fibres, in particular even flows around said fibres.

Dutch Patent Application 9000014, which has been laid open for inspection, discloses a device of the abovementioned type which is assembled from modules. This device is such that it can be flowed through by two different medium streams. One medium flows through the fibres, while the other medium flows around the fibres. Each module has a housing which, on the one hand, defines a flow channel for the medium flowing around the fibres and, on the other hand, defines chambers into which the ends of the fibres open. On the basis of one type of module, through a suitable shape of said housing, which is a point-symmetrical square, polygonal or round shape with open front and rear side, and through a suitable arrangement of the supply and discharge orifices which open into the chambers, the device can be assembled in such a way that the direction of the fibres of the successive modules runs alternately at essentially right angles. This means that the medium flowing through the fibres in each case flows alternately in two directions running at right angles to each other, while the medium flowing outside the fibres flows in a crosswise direction to the fibres, i.e. at an angle of approximately 90°, which produces a particularly effective material and/or heat exchange between the two medium streams. Assembling such a device from modules means that a relatively cheap construction from standard parts can be achieved, while the size of the device, and thus its capacity, are relatively easy to increase and reduce through the use of more or fewer modules.

The object of the present invention is to provide a device for material and/or heat transfer between mediums, which device can be assembled from modules and is such that it can be flowed through by more than two, in particular three, medium streams. The object here is that the advantages of the known modular device for the throughput of two medium streams should be retained as regards the modular assembly from the smallest possible number of different basic modules, in particular a single shape for the modules, said modules simultaneously forming flow channels for all medium streams moving through them, so that through interconnection of the various modules no further separate housing is required in order to convey one or more of the medium streams.

SUMMARY OF THE INVENTION

The foregoing object is achieved by way of the present invention wherein a device for the transfer of material and/or heat from one medium stream to another medium stream, which device is assembled from interconnected modules, each module (1) having a number of hollow membrane fibres (2) or tubes, which fibres or tubes are designed to be flowed through by a first medium, while a second medium can flow outside said fibres or tubes, and the ends of said fibres or tubes project in a sealed manner through module walls (3, 4) lying essentially opposite each other and open into a plurality of chambers (5, 6) with a supply orifice (7) for the supply of medium and a discharge orifice (8) for the discharge of medium, the supply orifice (7) and the discharge orifice (8) of adjacent modules (1) being in register and being connected to each other in a fluid-tight manner, and the chambers (5, 6) forming part of a module housing, being point-symmetrical relative to the direction of flow of the second medium and being a square, polygonal or circular shape, which housing is open at the front and rear side, for the formation of a throughflow channel for the second medium flowing outside the fibres, characterized in that in the device the housing of each module includes means for separately conveying a third medium stream, in such a way that, essentially in a manner corresponding to the first medium, for each module both the first medium and the third medium flow through hollow membrane fibres provided separately for them, or in such a way that the third medium stream flows from module to module essentially parallel to the direction of the second medium stream, without passing through hollow membrane fibres, and is equipped with further supply orifices (9) and discharge orifices (10) for collecting said third medium stream from a preceding module of delivering it to a following module.

On the one hand, the invention provides a modular device in which one medium stream flows through the fibres, the other medium stream flows around the fibres, and a third medium stream flows through the housing of the modules separately from the other two medium streams. If the first and second medium streams are used for, for example, material exchange, the third medium stream, for example in counterflow to the second medium stream, can act as a cooling and/or heating medium. In that connection, it can be ensured, for example, that the medium stream moving through the fibres passes through the modules in flow directions running alternately at angles, as the result of corresponding alternate alignment of the fibres. On the other hand, the invention can provide a device in which a first and a third medium stream move through individual groups of fibres in each case, while the second medium stream flows around both fibre groups. In addition to that, yet a fourth medium stream, for example, could then be conveyed through the modules, possibly for an additional heating or cooling effect, which fourth stream, for example, moves in counterflow to the second medium stream and neither flows through the fibres nor flows directly around them.

While each module can be provided with fibres running essentially in one direction, an embodiment in which modules have fibres running in different directions is also envisaged. This makes it possible, for example, that for each module two or more separate medium streams flow through respective fibre bundles, which a common, further medium flows around.

The invention is explained in greater detail below by way of example by a number of non-limiting exemplary embodiments with reference to the appended drawings, in which:

FIG. 1 shows a view in perspective, partially cut away, of a first embodiment of a module according to the invention;

FIG. 2 shows a view in perspective of an assembly of two modules according to the present invention, in which said modules are shown in the assembled state at a distance from each other;

FIGS. 3a to 3c show diagrammatic front views of various embodiments of modules according to the present invention;

FIG. 4 shows diagrammatically in side view an assembly of modules according to the present invention; and FIGS. 5a to 5c show a diagrammatic view of a further embodiment of the module according to the present invention, in front view.

FIG. 1 shows a module 1, which is cut away for the sake of clarity. Said module 1 has a bundle of hollow fibres 2, running essentially parallel to each other in one direction and being inserted by their ends in a fluid-tight manner through opposite walls 3, 4, and opening into opposite fluid collection chambers 5, 6. Said fluid collection chambers 5, 6 form part of a housing which forms a flow channel for a fluid stream which flows around the fibres 2 on their outside in the direction of the arrow A. Viewed in that direction of flow, said housing is square, i.e. point-symmetrical. Situated at the front of the housing is a supply orifice 7 which opens into the chamber 5, for the supply of fluid which will flow through the fibres 2. At the rear side of the housing is a discharge orifice 8 which opens into the chamber 6. The fluid which has flowed through the fibres 2 and has collected in the chamber 6 is discharged through the discharge orifice 8. As shown, the supply orifice 7 is situated diagonally opposite the discharge orifice 8. The two opposite side walls of the housing are hollow and form flow chambers 11. A further fluid, separated from the fluid flowing through the fibres 2, and separated from the fluid flowing around the fibres 2, can flow through said flow chambers 11. For example, a cooling or heating medium can flow through said chambers 11, for example in counterflow to the fluid flowing around the fibres 2. A supply orifice 9 and a discharge orifice 10 each open into the respective chambers 11. In the case of the chamber 11 on the right in the drawing the supply orifice 9 is situated at the rear side of the housing, near the chamber 6. The corresponding discharge orifice 10 (not visible) is situated diagonally opposite, viewed in side view of the housing, the respective supply orifice 9 at the front side of the housing, near the chamber 5. In the case of the chamber 11 on the left in the drawing the arrangement of the supply orifice 9 and discharge orifice 10 is exactly the other way round. This means that the supply orifices 9 and the discharge orifices 10 of the opposite chambers 11 are situated diagonally opposite each other on the rear wall and the front wall respectively of the housing of the module 1.

A transfer device can be assembled with modules according to the embodiment shown in FIG. 1 by arranging such modules 1 in succession, viewed in the direction of the arrow A, with the fibres 2 running in a direction in each case rotated through ninety degrees. This makes it possible to achieve an embodiment of the transfer device which in principle corresponds to the assembly shown in FIG. 2.

FIG. 2 shows an assembly of two modules 1, the design of each of which corresponds essentially to that of the module 1 shown in FIG. 1. The construction of the rear side of one of said modules 1 is shown diagrammatically by dashed lines. Unlike the embodiment shown in FIG. 1, the modules 1 shown in FIG. 2 have slit-shaped supply and discharge orifices 7, 8 and 9, 10 respectively. Said slit-shaped orifices cover virtually the entire width and height respectively of the chambers 5, 6 and 11 respectively. Each module 1 also has only one chamber 11. It is possible for it to have two chambers, if desired. The modules 1 are alternately rotated through ninety degrees relative to each other in each case, viewed in the direction of the arrow A. This means that the lengthwise direction of the fibres 2 is also rotated through ninety degrees in each case. The assembly of FIG. 2 can be extended by further modules 1 as required, the modules in each case having an alternating lengthwise orientation of the fibres 2. The mode of operation is then as follows: the housings of the adjacent modules 1 form a flow channel for a first fluid which flows in the direction of the arrow A and flows around the fibres 2 on the outside. A second fluid can be supplied to the chamber 6 by way of the supply orifice 7 of the front module 1a in the drawing. From there, said second fluid flows through the fibres 2 and passes into the chamber 5. Said second fluid leaves the module 1a by way of the discharge orifice 8 at the rear side, and flows directly into the supply orifice 9 of the chamber 11 of the rear module 1b in the drawing. Said second fluid will then leave the module 1b directly again at the rear side by way of the discharge orifice 10, without flowing through the fibres 2. A third fluid can flow, for example, from the rear side into the supply orifice 7 of the chamber 6 of the rear module 1b in the drawing. Said third fluid then flows through the fibres 2 and passes into the chamber 5 of the module 1b, and leaves the latter by way of the slit-shaped discharge orifice 8. Flowing in the opposite direction to that of the arrow A, said third fluid passes by way of the slit-shaped supply orifice 9 into the chamber 11 of the front module 1a in the drawing. Said third fluid will leave the module 1a directly again by way of the slit-shaped discharge orifice 10 in the chamber 11, without flowing through the fibres 2. Two fluids will thus flow alternately through the fibres, for example in counterflow, as outlined above. Of course, it is also possible for those two fluids to flow in the same direction in succession through the modules 1, for example both from the front module 1a to the rear module 1b in the drawing. The direction of flow of the first fluid which flows around the fibres 2 can also be the opposite from that shown in FIG. 2.

FIGS. 3a to 3c show front views of various embodiments for the module 1 by means of which an assembly whose mode of operation corresponds to that of the assembly shown in FIG. 2 can be achieved. FIG. 3a shows diagrammatically in front view an embodiment in which the chambers 5, 6 and 11 in each case have supply and discharge orifices 7, 8, 9, 10 respectively both at the front and at the rear side. Such modules shown in FIG. 3a can be aligned with the fibres in parallel, but also alternately, with the fibres at an angle of 90°. If the fibres are in a parallel alignment, the chambers 11 form continuous flow channels for the passing through of, for example, a heating or cooling medium. The supply slit 7 into the chamber 6 of the front module is sealed, and the discharge slit 8 from the chamber 5 of the rear module is sealed. A medium can be supplied by way of the supply orifice 7 into the chamber 5 of the front module, and is uniformly distributed over the various successive chambers 5, following which said medium will flow through the fibres to the respective opposite chambers 6, and will ultimately collect again at the chamber 6 of the rear module, and then leave the transfer device by way of the discharge orifice 8. It is, of course, also possible to select a different sequence of sealing of a supply and a discharge orifice 7, 8, for the distribution of a medium uniformly over the chambers 5 or 6 disposed directly after one another and, after it has flowed through the fibres, for collection thereof from the chambers 6 or 5 disposed directly after one another. If the modules are disposed alternately with the fibres at an angle of 90°, an assembly in which the chambers 5 and 6 form a continuous flow channel alternately with a chamber 11 of the following module can be obtained. In the front module supply slit 7 of chamber 6 is again sealed, and also orifice 10 of chamber 11. In the rear module discharge slits are sealed in such a way (depending on an even or odd number of modules) that a medium entering the first module through supply orifice 7 of chamber 5 can flow through the fibres of modules 1, 3, 5 etc. to the opposite chambers 6, and that a medium flowing into the supply slit 8 of chamber 5 in the second module by way of discharge orifice 9 can flow through the fibres of module 2, 4, 6 etc. to the opposite chamber 6 and in this way either leave the assembly through a chamber 6 or a chamber 11 of the last module. As FIG. 3b shows, the chambers 5, 6 are not disposed in such a way that they are fully opposite each other. Here again, it is possible for two separate fluid streams flowing through the successive modules to pass alternately through the fibres 2 and the chamber 11 respectively. FIG. 3c shows an embodiment in which a module contains a first fibre bundle 2 and a second fibre bundle 12, which fibre bundles 2, 12 mutually form essentially a right angle. This means that a first fluid can be supplied to the supply orifice 7 and then leaves the module 1 by way of the fibres 2 through the discharge orifice 8. A second fluid can be supplied to the supply orifice 9 and then leaves the module 1 by way of the fibres 12 through the discharge orifice 10. A number of these modules can also be disposed in succession to form a transfer device which is suitable for passing three or more fluids through it, and in which the housing of the modules automatically defines the flow channel for the fluid which flows around the fibres 2, 12 on the outside. Besides, the fibres 12, like the fibres 2, project with their ends in a sealing manner through respective walls 13 and open into the chambers 11. The embodiment of FIG. 3c can also be designed identically to that of FIG. 3a, as regards the supply and discharge orifices 7, 8, 9, 10.

FIG. 4 shows a transfer device 14, which is assembled from, for example, the modules 1 shown in FIG. 2. The large arrow A indicates the flow of the fluid which flows around the fibres 2 on the outside. The solid lines with arrows and the dashed lines with arrows indicate respectively the two fluid streams B and C, separated from each other, which flow in turn through the fibres 2 and through the chamber 11 of a respective module 1. As shown, the fluid streams B, C flow in opposite directions. The fluid stream B will flow through the fibres 2 immediately on entering the first module 1, and at the second module 1 will flow through the chamber 11, and subsequently at the third module 1 will flow again through the fibres 2, and so forth. Where the fluid stream B flows through the fibres, the fluid stream C will flow through the chamber 11 of the respective module 1. For example, the fluid stream B is a relatively cold fluid which while flowing through the transfer device 14 is preheated, and is then heated to the desired final temperature in a heating element 15 outside the transfer device 14, following which it flows as fluid stream C back through the transfer device 14, so that while flowing through the fibres 2 it releases a substance to the fluid stream A. Of course, the streams B and C can also flow in the same main direction, both in the opposite direction to that of stream A and also in the same main direction as stream A.

FIGS. 5a to 5c show an embodiment of the invention for throughflow of fibres which in each case are rotated through an angle other than 90 degrees in the case of six successive modules 1, viewed in the direction of flow of the fluid stream which flows around the fibres on the outside. For this purpose, three fibre bundles are used, which bundles in each case open with their ends into respective chambers 5, 6; 11a, 11b; 16a, 16b situated opposite each other. Initially, a first fluid stream will enter the chamber 5 and flow in the direction of the arrow (a) through a fibre bundle to reach the opposite chamber 6 (FIG. 5a), and will then flow to the next module, viewed in the direction of flow of the fluid flowing around the fibres on the outside. At that point said first fluid enters the chamber 11a and flows in the direction of the arrow (b) through the fibres into the chamber 11b (FIG. 5b), and passes into the third module. At said third module the fluid stream enters the chamber 6 and flows in the direction of the arrow (c) through the fibres into the chamber 5 (FIG. 5c), and then passes into the fourth module. Said fluid stream enters said fourth module by way of the chamber 11a and flows in the direction of the arrow (d) through the fibres and into the chamber 11b (FIG. 5a). It then passes into the fifth module. The fluid stream enters said fifth module by way of the chamber 6 and flows in the direction of the arrow (e) through the fibres into the chamber 5 (FIG. 5b). It then passes into the sixth module. The fluid stream enters the sixth module by way of chamber 16b and flows in the direction of the arrow (f) through the fibres into the chamber 16a (FIG. 5c). It can then pass into, for example, a seventh module. Said seventh module is again disposed as shown in FIG. 5a, but the fluid stream now enters said seventh module by way of the chamber 6 and flows in the direction opposite to that of the arrow (a) into the chamber 5, and passes out from there into an eighth module. In the same way a second fluid stream can be supplied in counterphase relative to the first fluid stream to, for example, the chamber 16a of the first module, and flows through fibres into the opposite chamber 16b (FIG. 5a). Thereafter, said second fluid stream can flow into the next module again, and the process can be followed in the way described above. Of course, yet further variants on the basis of the embodiment shown in FIG. 5 are conceivable. For example, an embodiment in which the chambers 5 and 6, the chambers 16a and 11b and the chambers 11a and 16b of each module are connected to each other by means of hollow fibres is conceivable. Also conceivable is a module based on FIG. 5 in which only two chambers situated diametrically opposite each other (i.e. chambers 5 and 6 or chambers 16a and 11b or chambers 11a and 16b) are connected to each other by hollow fibres. The remaining chambers then define at the front and rear side of the module open throughflow channels for throughflow parallel to the direction of flow of the core stream inside the module. For example, an assembly based in each case on three linked identical modules which are rotated through 60° relative to each other in each case can then be constructed, so that in each case one of the three medium streams moving outside the core stream flows through the fibres from one chamber to the chamber situated diametrically opposite, and then in the case of the two following modules moves only through the respective chambers parallel to the direction of flow of the core stream. Moreover, it is not absolutely essential for the module to have a circular cross-section. For example, a polygonal cross-section can also be selected, in connection with the embodiment shown in FIG. 5 with six chambers, for example a hexagon, with the chambers being accommodated in the respective sides of the hexagon.

On the basis of the embodiment illustrated in FIG. 5, it is also possible for a medium to flow through one or more chambers to another chamber in the module, while not being conveyed through a bundle of hollow fibres, but remaining constantly moving parallel to the direction of flow of the core stream through the various successive modules. Of course, this can also be applicable to various medium streams which are separated from each other. One or more medium streams then transfer from one chamber to the other chamber within one module or successive modules. In that context it is, for example, also possible—and this consideration applies to all possible embodiments shown in FIGS. 1 to 5—to make the same medium stream move in each case for each module through the hollow fibres from one chamber to a chamber situated opposite by way of a branch, while the main stream of said medium stream continues to flow through the successive modules, parallel to the direction of flow of the core stream and without flowing though the hollow fibres, through the directly adjacent respective chambers of said modules. A further variant which is conceivable in the embodiment based on the principle described above, in which it is ensured that in each case two separate medium streams flow constantly parallel to the direction of flow of the core stream through the directly adjacent chambers of successive modules while, for example, a partial stream of one of said medium streams around the other module in each case branches off, flows through the hollow fibres into a module, and moves to a chamber situated opposite.

Of course, further variants, involving combinations of measures from the individual embodiments described and illustrated here, are also within the scope of the present invention. For example, a pattern of holes can be selected instead of a slit for orifices.

I claim:

1. A device for the transfer of material and/or heat from one medium stream to another medium stream, which device is assembled from interconnected modules, each module (1) having a number of hollow membrane fibres (2) or tubes, which fibres or tubes are designed to be flowed through by a first medium, while a second medium can flow outside said fibres or tubes, and the ends of said fibres or tubes project in a sealed manner through module walls (3, 4) lying essentially opposite each other and open into a plurality of chambers (5, 6) with a supply orifice (7) for the supply of medium and a discharge orifice (8) for the discharge of medium, the supply orifice (7) and the discharge orifice (8) of adjacent modules (1) being in register and being connected to each other in a fluid-tight manner, and the chambers (5, 6) forming part of a module housing, being point-symmetrical relative to the direction of flow of the second medium and being a square, polygonal or circular shape, which housing is open at the front and rear side, for the formation of a throughflow channel for the second medium flowing outside the fibres, characterized in that in the device the housing of each module includes means for separately conveying a third medium stream, in such a way that, essentially in a manner corresponding to the first medium, for each module both the first medium and the third medium flow through hollow membrane fibres provided separately for them, or in such a way that the third medium stream flows from module to module essentially parallel to the direction of the second medium stream, without passing through hollow membrane fibres, and is equipped with further supply orifices (9) and discharge orifices (10) for collecting said third medium stream from a preceding module or delivering it to a following module.

2. Device according to claim 1, in which the module housing has at least one further chamber (11) into which the orifices (9, 10) open.

3. Device according to claim 1, in which the supply orifices (7) and discharge orifices (8) of each module, relative to the direction of flow of the second medium, are situated at opposite areas of the module housing.

4. Device according to claim 1, in which the orifices (9, 10), relative to the direction of flow of the second medium, are situated at the same side of the module housing.

5. Device according to claim 1, in which the modules are disposed in such a way that the fibres of adjacent modules form essentially a right angle.

6. Device according to claim 5, in which the first and third medium stream passing through the modules in succession flow around the other module alternately through the fibres (2).

7. Device according to claim 1, in which at least a number of modules (1) contain further fibres (12) which form essentially a right angle with the fibres (12) mentioned earlier, which fibres (12) project in a fluid-tight manner through opposite wall parts (13) and open out in opposite chambers (11) of the module housing which contain the supply and discharge orifices (9, 10).

8. Module for assembly of the device according to claim 1, comprising a number of hollow membrane fibres (2) or tubes, which fibres or tubes are designed to be flowed through by one of the medium streams, while the other medium stream flows outside said fibres, and the ends of said fibres or tubes project in a fluid-tight manner through wall parts (3, 4) which, relative to the direction of flow of the second medium, are situated opposite each other and form part of chambers (5, 6) with an orifice for the supply (7) or discharge (8) of the first medium, while the chambers (5, 6) form part of a point-symmetrical housing which is a square, polygonal or circular shape, which housing is open at the front and rear side, for the formation of a throughflow channel for the second medium flowing around the fibres at the outside, and in which the module housing includes means for conveying separately a third medium stream and has supply (9) and discharge orifices (10) for collecting said third medium from a preceding module, viewed in the direction of flow of the second medium, and delivering it to a following module.

9. Module according to claim 8, which comprises further fibres (12) which are capable of being flowed through by the third medium and are in fluid communication with said further orifices (9, 10), and which further fibres (12) form essentially a right angle with said fibres (2) through which the first medium is to flow.

* * * * *